(12) United States Patent
Bacus et al.

(10) Patent No.: US 8,438,648 B2
(45) Date of Patent: May 7, 2013

(54) PREVENTING UNAUTHORIZED FONT LINKING

(75) Inventors: Mike Bacus, Tigard, OR (US); Bruce Quincy Hammond, Beaverton, OR (US)

(73) Assignee: Celartem, Inc., Portland, OR (US)

( * ) Notice: Subject to any disclaimer, the term of this patent is extended or adjusted under 35 U.S.C. 154(b) by 466 days.

(21) Appl. No.: 12/706,222

(22) Filed: Feb. 16, 2010

(65) Prior Publication Data

US 2011/0203000 A1    Aug. 18, 2011

(51) Int. Cl.
*G06F 21/00* (2006.01)

(52) U.S. Cl.
USPC .............. 726/26; 380/200; 380/242; 713/187

(58) Field of Classification Search ................ 726/26; 713/187
See application file for complete search history.

(56) References Cited

U.S. PATENT DOCUMENTS

| | | | |
|---|---|---|---|
| 7,095,873 B2* | 8/2006 | Venkatesan et al. | 382/100 |
| 7,404,297 B2* | 7/2008 | Chen | 62/64 |
| 2005/0053258 A1* | 3/2005 | Pasqua | 382/100 |
| 2005/0193089 A1* | 9/2005 | Kahari et al. | 709/217 |
| 2006/0069992 A1* | 3/2006 | Hodder | 715/535 |
| 2007/0003059 A1* | 1/2007 | Langelaar | 380/241 |
| 2007/0091376 A1* | 4/2007 | Calhoon et al. | 358/3.28 |
| 2010/0218086 A1* | 8/2010 | Howell et al. | 715/236 |

OTHER PUBLICATIONS

LDevroye et al "Web fonts", 2009.*
JKew et al, "WOFF File Format", 2009.*
International Search Report and Written Opinion of the International Searching Authority dated May 2, 2011 in International Application No. PCT/US 11/24876.
Open Font Library, "Web Font linking and Cross-Origin Resource Sharing," Jul. 9, 2009. Retrieved on Mar. 31, 2011, from the Internet: http://openfontlibrary.org/wiki/Web_Font_linking_and_Cross-Origin_Resource_Sharing.
Devroye, Luc, "Web Fonts." Retrieved on Mar. 31, 2011, from the Internet: http://cg.scs.carleton.ca/~luc/webfonts.html.
Kew et al., "WOFF File Format," Oct. 23, 2009. Retrieved Mar. 31, 2011 from: http://people.mozilla.org/~jkew/woff/woff-2009-10-23.html.

* cited by examiner

*Primary Examiner* — Andy Rao
*Assistant Examiner* — Shan Elahi
(74) *Attorney, Agent, or Firm* — Banner & Witcoff, Ltd.

(57) ABSTRACT

Methods, computer readable media, and apparatuses for preventing unauthorized font linking are presented. A request for a font file may be received. It may be determined whether the request is valid, and this determination may be based on a security token and/or a referrer string. If the request is determined to be valid, a first watermark may be embedded in the font file, and the first watermark may be based on the security token. The first watermark may include at least one point in at least one glyph contained in the font file. A second watermark may be embedded in the font file, and the second watermark may include at least one table that identifies a customer. The font file then may be served to the requestor.

21 Claims, 7 Drawing Sheets

```
<html>
<head>
<style type="text/css">

@font-face {
        font-family: someFont;
        src: url(web-font.company.com/SF01534-57-23349/someFont.ttf);
}

...

</style>
</head>
<body>

...

</body>
</html>
```

PREVENTING UNAUTHORIZED FONT LINKING

BACKGROUND

Style sheet languages may be used to control the formatting and presentation of structured documents, such as documents written in markup languages like Hyper Text Markup Language ("HTML") and Extensible Markup Language ("XML"). Using style sheet languages, the contents of a document, which may be included in an HTML or XML computer file, thus may be defined and stored independently of the formatting of the document, which may be stored in a style sheet computer file.

Today, Cascading Style Sheets ("CSS") is a popular style sheet language by which one or more style parameters of a structured document, such as a webpage, may be controlled and/or modified. For example, using CSS, a webpage developer may control the background color or image of a webpage; the spacing and location of paragraphs and other body elements like images and tables; and the color, size, and face of fonts used in the webpage. CSS includes a plurality of commands for controlling and/or modifying such parameters, including, for example, the @font-face command.

In the past, when the @font-face command was yet to be supported by many web browsing computer programs, a website developer may have been limited in selecting one or more fonts to be used in a webpage because the website developer may have had to account for the possibility that at least one of the selected fonts might not be installed on the computer of a user who later might access the webpage. In the present, however, by using the @font-face command in the CSS code of a webpage, a website developer may link to a font stored elsewhere on the Internet, such that when a user accesses the webpage, the user's computer may display the webpage using the linked font even though the linked font might not be installed on the user's computer in advance of accessing the webpage.

While the @font-face command may be used in providing such functionality, a website developer further may wish to allow only certain, authorized servers and/or websites to access linkable fonts maintained online by the website developer. In some instances, it may be desirable to limit access to linkable fonts because a website developer may wish to control the amount of bandwidth used in providing linkable fonts. In other instances, it may be desirable to limit access to linkable fonts because a website developer's use of linkable fonts may be subject to license restrictions, and the website developer may be required to limit access to linkable fonts by the terms of such license restrictions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to preventing unauthorized font linking Unauthorized font linking may include, for example, using an @font-face command in CSS code to link to a font, where the font is stored on a server by a developer, and where the developer's consent to the font linking has not been obtained. According to one or more aspects, a request for a font file may be received. Subsequently, it may be determined whether the request is valid. In response to determining that the request is valid, a first watermark may be embedded in the font file, and the first watermark may include at least one point in at least one glyph contained in the font file. Additionally or alternatively, a second watermark may be embedded in the font file, and the second watermark may include at least one table that identifies a customer. Then, the font file may be served. By serving the font file after embedding one or more watermarks in the font file, it may be determined later whether a copy of the font file was improperly made or taken by searching for copies of the watermarked font file in locations not authorized to store or use the font file. Thereafter, a network may be searched for at least one website, and it may be determined, based on one or more watermarks included in a font linked to be the at least one website, whether the at least one website improperly links to the font.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
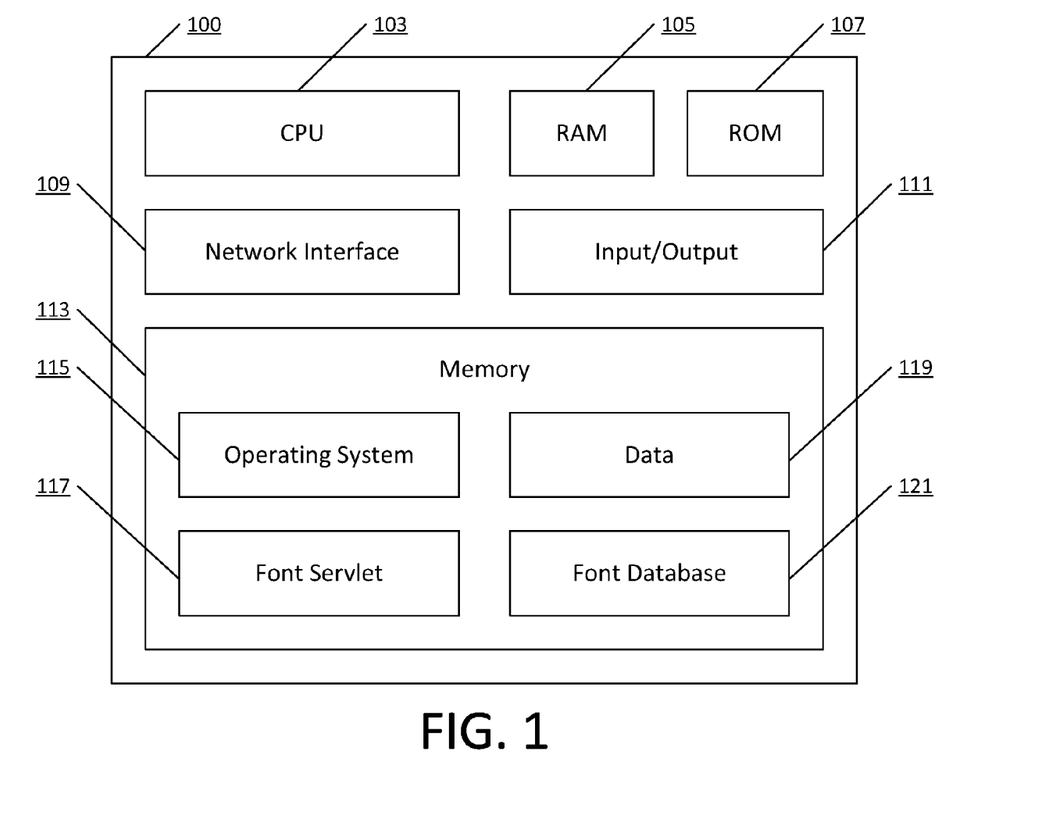
FIG. 1 illustrates an example system in which one or more aspects of the disclosure may be implemented.

FIG. 1 illustrates an example system in which one or more aspects of the disclosure may be implemented. In one or more configurations, one or more aspects described herein may be implemented as a computer program and/or a combination of computer programs for use with a computer 100 and/or stored in memory 113. Computer 100 represents a generic computing device, e.g., a desktop computer, laptop computer, notebook computer, network server, portable computing device, personal digital assistant, smart phone, mobile telephone, distributed computing network device, and/or any other device having the requisite components and/or abilities to operate as described herein and thereby be configured as a special-purpose device according to one or more illustrative aspects of the disclosure. Computer 100 may include central processing unit or other processor 103, RAM or other volatile memory 105, ROM or other boot memory 107, network interface(s) 109 (e.g., Ethernet, wireless network interface, modem, etc.) through which computer 100 may connect to a wide area network and/or local area network (e.g., Internet, LAN, WAN, PAN, etc.), input/output port(s) 111 (e.g., keyboard, mouse, monitor, printer, USB ports, serial ports, parallel ports, IEEE 1394/Firewire ports, and the like), and non-volatile memory 113 (e.g., fixed disk, optical disk, holographic storage, removable storage media, flash drive, etc.). Computer 100 may store various programs, instructions, applications, and data in memory 113, including, but not limited to, operating system software 115, font servlet 117 (e.g., one or more plug-ins and/or other font software described herein), data 119 (e.g., documents, files, and other data described herein), and font database 121 (e.g., one or more font files and/or other files described herein).

One or more aspects of the disclosure may be embodied in computer-usable data and/or computer-executable instructions, such as in one or more program modules, executed by one or more computers or other devices to render one or more fonts for output on a device such as a display or a printer. Generally, program modules include routines, programs, objects, components, data structures, etc. that perform particular tasks or implement particular abstract data types when executed by a processor in a computer or other data processing device. The computer-executable instructions may be stored on a computer-readable medium such as a hard disk, optical disk, removable storage media, solid state memory, RAM, etc. As will be appreciated, the functionality of the program modules may be combined or distributed as desired in various embodiments. In addition, the functionality may be embodied in whole or in part in firmware or hardware equivalents, such as integrated circuits, field programmable gate arrays (FPGA), and the like. Particular data structures may be used to more effectively implement one or more aspects of the disclosure, and such data structures are contemplated to be within the scope of computer executable instructions and computer-usable data described herein.

Figure 2:
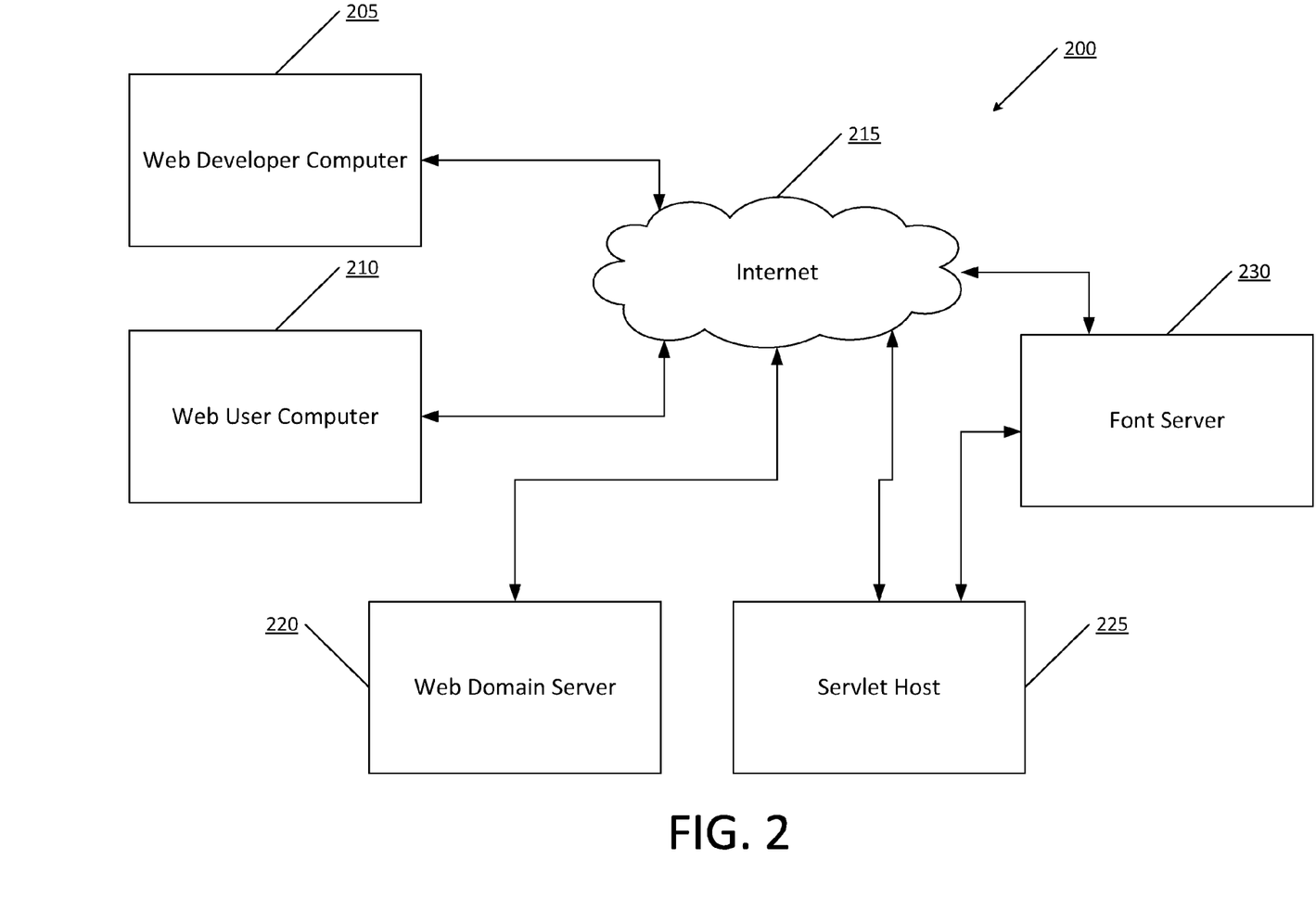
FIG. 2 illustrates an example network environment in which one or more aspects of the disclosure may be implemented.

FIG. 2 illustrates an example network environment 200 in which one or more aspects of the disclosure may be implemented. Network environment 200 may include one or more computers, such as web developer computer 205, web user computer 210, web domain server 220, servlet host 225, and font server 230. In addition, network environment 200 may contain one or more local area networks ("LANs") and/or one or more wide area networks ("WANs," e.g., the Internet 215).

According to one or more aspects, web developer computer 205 may be a computer used by a website developer or other user in designing and developing a website and/or CSS code. Web user computer 210 may be a computer used by a web user in browsing one or more websites on the Internet 215. Web domain server 220 may be a computer in which one or more websites and/or CSS code is stored and/or from which one or more websites and/or CSS code is served in response to remote requests. Servlet host 225 may be a computer in which one or more font-request processing and/or font serving computer programs and/or scripts are stored according to one or more aspects further described herein. Font server 230 may be a computer in which one or more fonts and/or one or more font databases are stored according to one or more aspects further described herein.

For example, a website developer may use web developer computer 205 to design and develop a website that includes CSS code. Subsequently, the website developer may upload the website, via the Internet 215, to web domain server 220. Alternatively or additionally, the website developer or other user may develop a website on domain server 220 remotely from developer computer 205. Thereafter, a web user may use web user computer 210 to access the website via the Internet 215. In accessing the website and executing the CSS code contained therein, the user may trigger a font request. As a result of triggering the font request, web user computer 210 and/or web domain server 220 may transmit a font request to servlet host 225. The font request may include a font request server address, a customer identifier, a security token, a font name, a font file name, and/or combinations thereof. In response to receiving the font request, servlet host 225 may process the font request, which may include parsing the font request, evaluating the font request server address, the customer identifier, security token, and/or the font name or font file name. If the servlet host 225 determines that the font request is invalid or unauthorized, the servlet host 225 might not take any further action or the servlet host may transmit a message denying the font request or other provide some other similar response. On the other hand, if the servlet host 225 determines that the font request is valid and/or authorized, the servlet host 225 may request one or more fonts corresponding to the font request from font server 230. In response to such a request, the font server 230 may transmit the one or more fonts corresponding to the font request to the servlet host 225, the web domain server 220, and/or to the web user computer 210. Additionally or alternatively, in response to receiving the one or more fonts corresponding to the font request from the font server 230, the servlet host 225 may transmit the one or more fonts corresponding to the font request to the web domain server 220 and/or web user computer 210. Thereafter, in response to receiving the one or more fonts corresponding to the font request, web user computer 210 may display and/or print the website with the one or more received fonts.

While network environment 200 is described as including various computers adapted to perform various functions, it should be understood that the system may be modified to include a greater or lesser number of computers which may be used alone or in combination to provide the same functionality. For example, a single computer may be used to perform all of the functions described, and one or more users may interact with the single computer through one or more terminals and/or user interfaces. In another example, a first computer may be used to perform all of the functions of web developer computer 205 and web user computer 210, and a second computer may be used to perform all of the functions of web domain server 220, servlet host 225, and font server 230.

Figure 3:
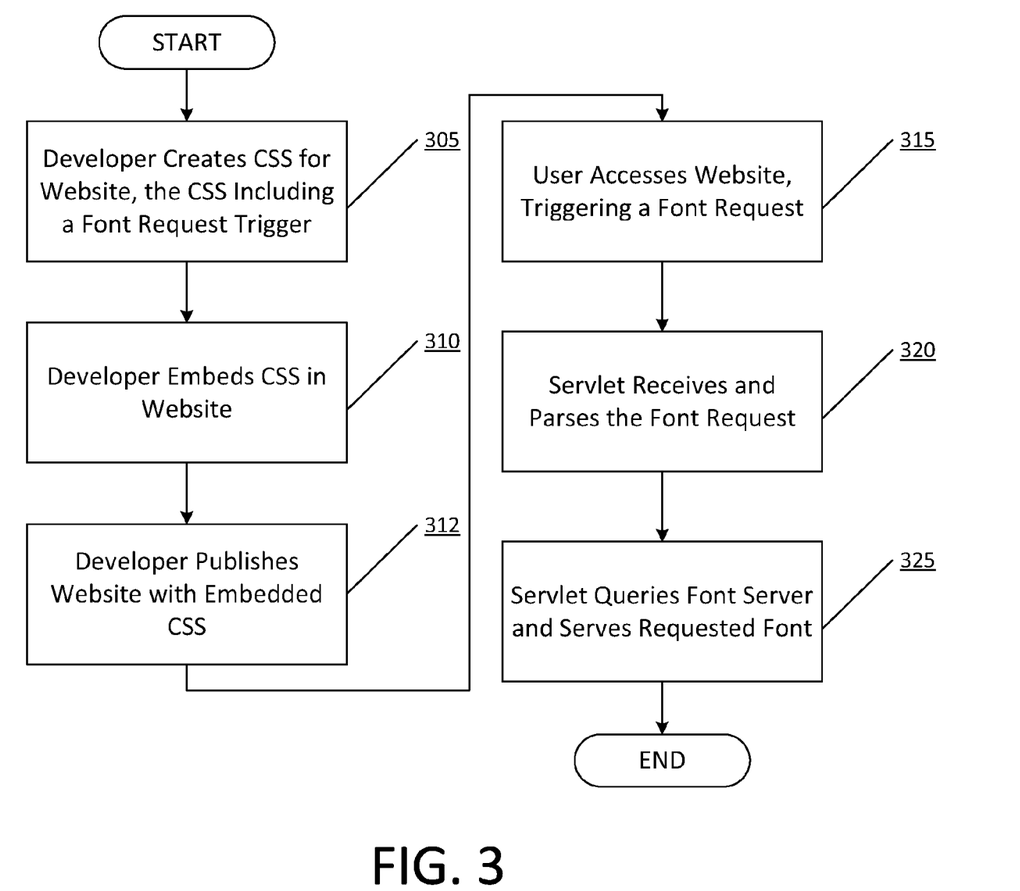
FIG. 3 illustrates a method by which a font request may be triggered and/or processed according to one or more aspects described herein.

FIG. 3 illustrates a method by which a font request may be triggered and/or processed according to one or more aspects described herein. According to one or more aspects, one or more of the computers, servers, and/or networks illustrated in FIG. 2 may implement the method illustrated in FIG. 3, as well as any variations thereof and/or any of other the methods described herein. Thus, in one or more arrangements, the method of FIG. 3 may be implemented in network environment 200.

In step 305, a developer may create CSS code for a website, and the CSS code may include a font request trigger, such as an @font-face command. For example, a developer may create a website code block such as code block 400, as further described below with respect to FIG. 4, where the website code block 400 may include a use of the @font-face command.

In step 310, the developer may embed CSS code in the website. For example, the developer may embed website code block 400 (FIG. 4) within other computer code that may form part or all of a website, and/or the developer may upload website code block 400 (FIG. 4) to a web server that may host part or all of the website.

In step 312, the developer may publish the website with the embedded CSS code. For example, the developer may change settings on a web server that hosts the website such that the CSS code in website code block 400 forms part of the published or "live" website. In this example, the website may be published over the Internet or over another network, such as a private corporate intranet.

In step 315, a user may access the website, thereby triggering a font request. For example, a user may use a computer and a web browser, such as APPLE SAFARI or GOOGLE CHROME, to access the website, and the web browser may download and/or execute the computer code for the website. In executing the computer code for the website, the user's web browser and/or the user's computer may process an @font-face command that may be included in the computer code for the website. In processing the @font-face command, the user's web browser and/or computer may request one or more fonts from a font server that may be identified by a font server address included in the @font-face command. In addition, in making such a request from a font server, the user's web browser and/or computer may transmit to the font server a customer identifier and/or security token and/or a font name and/or font file name that also may be contained in the @font-face command.

In step 320, a servlet may receive and parse the font request. For example, a servlet may receive the request from the user's web browser and/or computer in the example above, and the servlet may parse the request. Thus, if the received request was a Hypertext Transfer Protocol ("HTTP") GET request, such as, for example, "GET web-font.company.com/SF01534-57-23349/someFont.ttf," the servlet may parse the received request into three components: a font server address (which in this example would be "web-font.company.com/"), a customer identifier and/or security token (which in this example would be "SF01534-57-23349"), and a font name and/or font file name (which in this example would be "someFont.ttf"). According to one or more aspects, such parsing may be accomplished using regular expressions, character and/or text matching, and/or the like.

In step 325, the servlet may query the font server and/or serve the requested font. For example, after receiving and/or parsing the font request, the servlet may query the font server to obtain the requested font, and then the servlet may serve the requested and obtained font. More specifically, the servlet may query the font server in accordance with the results of the parsing described above, and thus the servlet may provide the font server with the parsed customer identifier and/or security token, and/or the servlet may provide the font server with the parsed font name and/or font file name. Subsequently, in response to such querying, the servlet may receive the requested font from the font server, which the servlet subsequently may transmit and/or serve to the user's web browser and/or computer.

According to one or more aspects further described below, the servlet may determine whether the request is valid before transmitting and/or serving the requested font, the servlet may evaluate a security token and/or a referrer string before transmitting and/or serving the requested font, and/or the servlet may embed one or more watermarks in the requested font before transmitting and/or serving the requested font. Various aspects of this process is described in further detail below with respect to FIG. 5.

Figure 4:
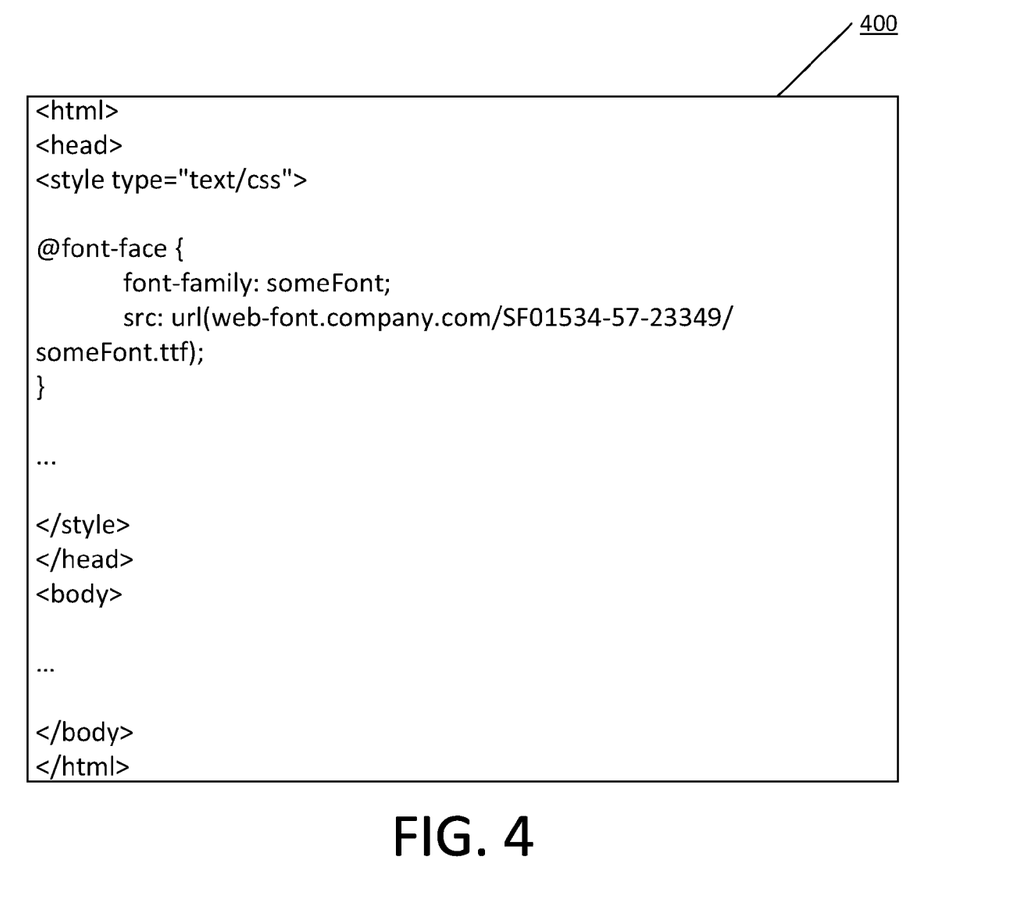
FIG. 4 illustrates an example of a font request according to one or more aspects described herein.

FIG. 4 illustrates an example of a font request according to one or more aspects described herein. As further described herein, a developer may create sample website code block 400, and the created sample website code block 400 may include a use of the @font-face command. When sample website code block 400 is downloaded and/or executed by a web browser and/or a computer, a font request based on the @font-face command and/or based on one or more arguments related to the command may be generated. With respect to the particular CSS code illustrated as sample website code block 400 in FIG. 4, the font request thus may be generated based on the source (i.e., "src") specified by the CSS code (i.e., "url (web-font.company.com/SF01534-57-23349/some-Font.ttf").

Figure 5:
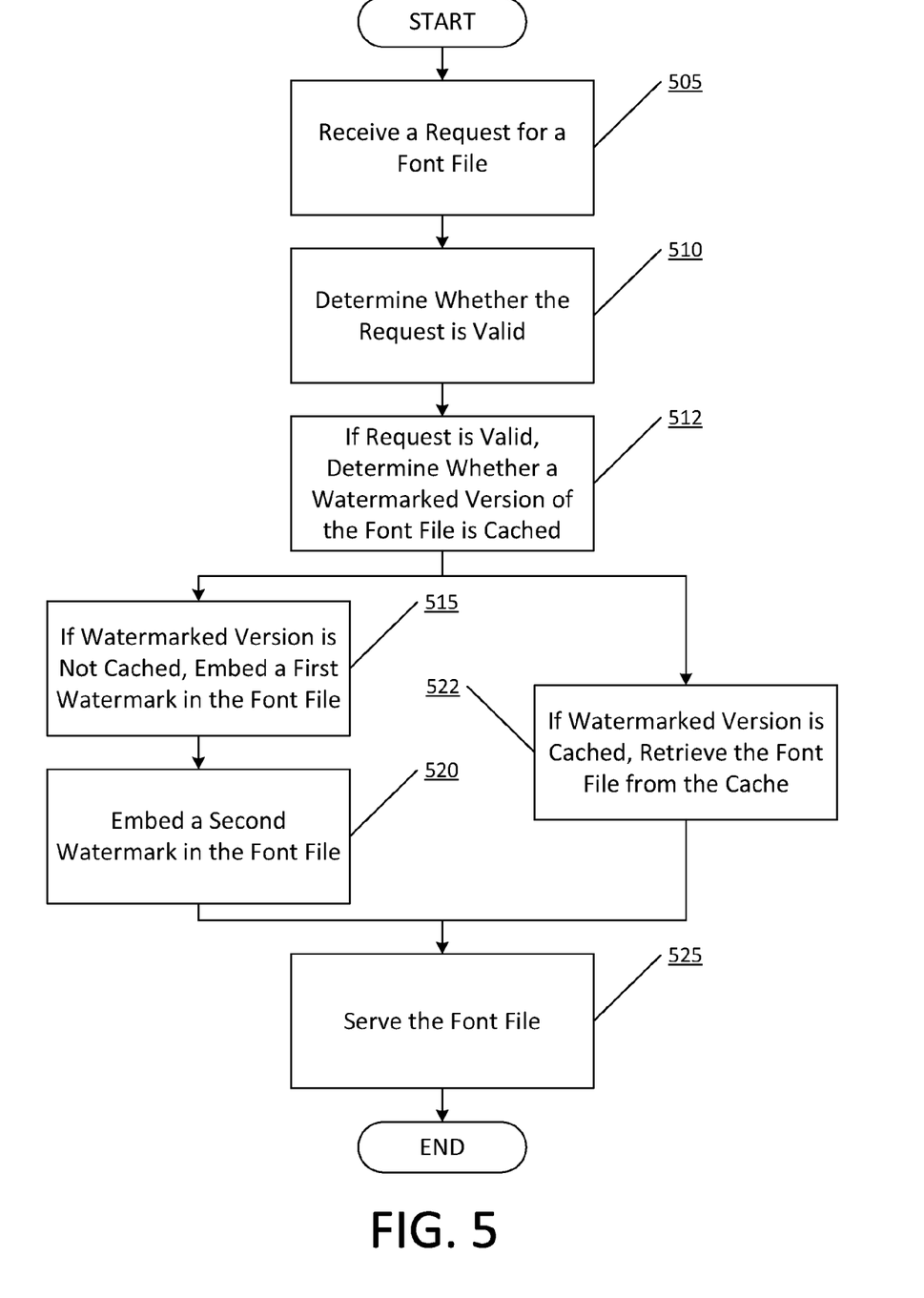
FIG. 5 illustrates a method by which a font request may be processed according to one or more aspects described herein.

FIG. 5 illustrates a method by which a font request may be processed according to one or more aspects described herein. By performing the method illustrated in FIG. 5, a font developer, manager, or licensee may be able to embed one or more watermarks into a requested font, which further may enable such an entity to later determine if a font on another entity's website was taken improperly from a server or website of the font developer, manager, or licensee. Accordingly, the watermark may be indicative of whether the use or copy of the font file is authorized. According to one or more aspects, one or more of the computers, servers, and/or networks illustrated in FIG. 2 may implement the method illustrated in FIG. 5, as well as any variations thereof and/or any of the other methods described herein. Thus, in one or more arrangements, the method of FIG. 5 may be implemented in network environment 200.

In step 505, a request for a font file may be received. For example, a servlet may receive a request for a font file from a user's web browser and/or computer. The request for the font file may be based on CSS code downloaded and/or executed by the user's web browser and/or computer, such as sample website code block 400. In addition, the request for the font file may include a font request server address, a customer identifier and/or security token, and/or a font name and/or font file name.

In step 510, it may be determined whether the request for the font file is valid. For example, the received request for the font file may be parsed and/or evaluated by the servlet, and one or more aspects of the received request may be considered in determining whether the received request is valid.

Figure 7:
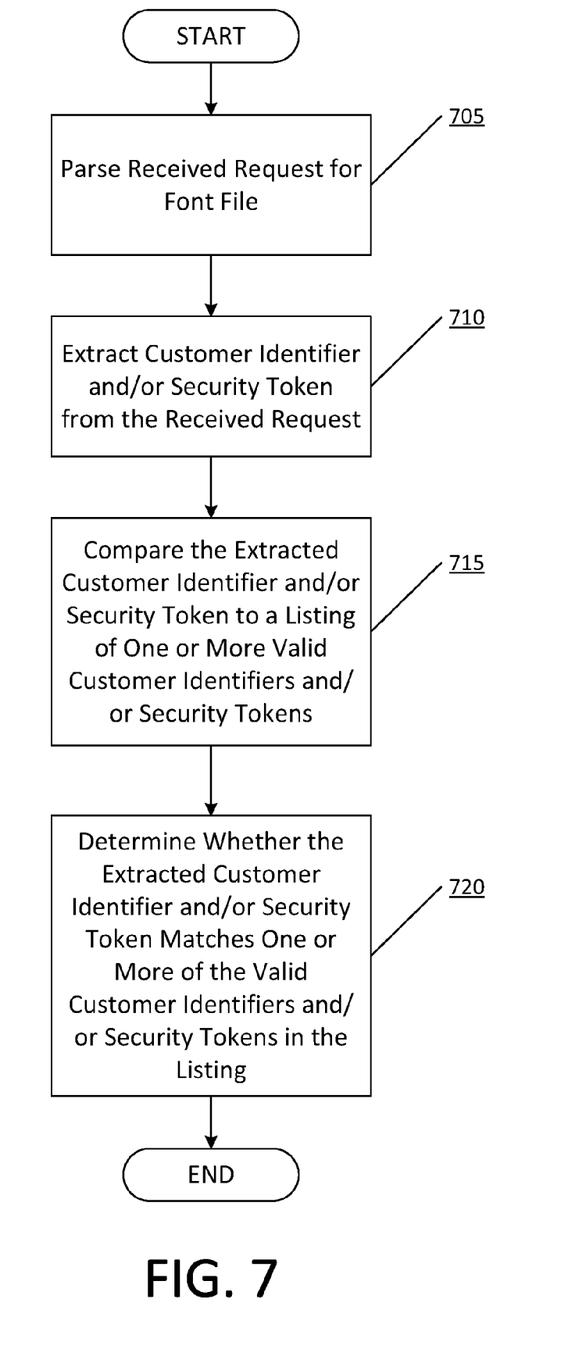
FIG. 7 illustrates a method by which a security token may be evaluated according to one or more aspects described herein

According to one or more aspects, determining whether the request for the font file is valid may be based on evaluating a security token. FIG. 7 illustrates a method by which a security token may be evaluated according to one or more aspects described herein. Thus, performing step 510 may include performing one or more of the steps of the method illustrated in FIG. 7. For example, in step 705, the received request for the font file may be parsed by the servlet, and in step 710, a customer identifier and/or security token may be extracted from the received request. Thereafter, in step 715, the extracted customer identifier and/or security token may be compared to a listing of one or more valid customer identifiers and/or security tokens. In step 720, it may be determined whether the extracted customer identifier and/or security token matches one or more of the valid customer identifiers and/or security tokens in the listing. If it is determined that the extracted customer identifier and/or security token matches one or more of the valid customer identifiers and/or security tokens, then it may be determined that the request for the font file is valid. On the other hand, if it is determined that the extracted customer identifier and/or security token does not match a valid customer identifier and/or security token, then it might be determined that the request for the font file is invalid.

For example, with respect to sample website code block 400 of FIG. 4, the corresponding customer identifier and/or security token of the received request for the font file may include "SF01534-57-23349." This customer identifier and/or security token may be parsed by the servlet and/or extracted, and then it subsequently may be compared to a listing of one or more valid customer identifiers and/or security tokens to determine its validity.

According to one or more additional aspects, determining whether the request for the font file is valid also may be based on evaluating a referrer string. For example, the received request for the font file may be made via an HTTP request, and the HTTP request may identify a referrer in a referrer string and/or header field of the HTTP request. The referrer string and/or header field of the HTTP request identifying the referrer may include the address of a computer, server, and/or website from which the request originated. Thus, the referrer string may be extracted from the received request, and thereafter, the referrer string may be compared to a listing of one or more valid referrer strings. If it is determined that the extracted referrer string matches one or more of the valid referrer strings, then it may be determined that the request for the font file is valid. On the other hand, if it is determined that the extracted referrer string does not match a valid referrer string, then it might be determined that the request for the font file is invalid.

In at least one arrangement, determining whether the request for the font file is valid in step 510 may be based both on evaluating a security token and on evaluating a referrer string. For instance, a system implementing one or more aspects of the disclosure may evaluate a customer identifier and/or security token (e.g., a customer identifier and/or security token parsed and extracted from a received request for a font file), as further described above and as illustrated in FIG. 7. Additionally, the system may evaluate a referrer string (e.g., a referrer string associated with a received request for a font file), as also described above. Based on the system determining both that the extracted customer identifier and/or security token matches one or more of the valid customer identifiers and/or security tokens, and that the extracted referrer string matches one or more of the valid referrer strings, the system may determine that the request for the font file is valid. In this way, the customer identifier and/or security token may be associated with the referrer string in determining whether the request for the font file is valid.

In step 512, if the request for the font file is determined to be valid, it may be determined whether a watermarked version of the font file is cached. In one or more arrangements, a watermarked version of the font file may be cached if a similar request for the font file was received previously, one or more watermarks were embedded in the font file, and the watermarked font file was stored in memory. By caching one or more watermarked font files, a system implementing one or more aspects of the disclosure may be able to conserve processing resources. For example, if the servlet determines that the received request for the font file is valid, the servlet may determine whether a watermarked version of the font file is cached by determining whether a version of the same font file, which may have been previously requested and watermarked using the same customer identifier and/or security token, is stored in memory. If the servlet determines that a watermarked version of the font file is not cached, the method may continue to step 515, and one or more watermarks may be embedded in the font file, as further described below. On the other hand, if the servlet determines that a watermarked version of the font file is cached, the method may continue to step 522, and the watermarked version of the font file may be retrieved from memory, as also further described below.

In step 515, a first watermark may be embedded in the font file if it is determined that a watermarked version of the font file is not cached. According to one or more aspects, the first watermark may be embedded in the font file by injecting one or more single points into one or more of the glyphs included in the font file. Additionally or alternatively, the one or more injected single points may be inserted into the one or more glyphs in a pattern based on a customer identifier and/or security token.

For example, in response to determining that a watermarked version of the font file is not cached, the servlet may obtain the requested font file and subsequently may embed a first watermark in the font file by injecting one or more single points into the one or more glyphs contained in the font file. Injecting the one or more single points into the one or more glyphs may include modifying that data in the font file to include one or more vectors of zero length (e.g., vectors that start and end at the same point) at coordinates determined by the servlet. In one or more arrangements, these single points or zero-length vectors might not be connected to any other points in the one or more glyphs, and thus, when the one or more glyphs of the font contained in the font file are rendered for display and/or printing, these single points might not be rendered even though data corresponding to these single points may be contained in the font file. More specifically, these single points might not be rendered because a computer may render a font by drawing the lines that define the font, and thus, a single, unconnected point that defines no line might not be renderable or might be understood by the rendering device as being a point that is not to be rendered.

In another example, the servlet may insert the one or more single points into the one or more glyphs contained in the font file in a pattern based on a customer identifier and/or security token, where the customer identifier and/or security token may be received in and/or extracted from the request for the font file. In this example, the servlet may compute a value based on the customer identifier and/or security token (e.g., a sum, product, checksum, MD5 hash, etc.), and the servlet may subsequently insert the one or more single points into the one or more glyphs contained in the font file in a pattern based on this computed value. Thus, in this example, the computed value might dictate how many and/or where one or more single points are inserted. For example, based on the particular customer identifier and/or security token, an offset value may be determined. The offset value may be an integer computed based on the particular customer identifier and/or security token using a modulo operation, for instance. Once an offset value is determined, a point may be inserted at a predetermined location of a particular glyph in the glyph table of the font file. Specifically, the point may be inserted at a predetermined location of a glyph that is the nth glyph in the glyph table, where n represents the determined offset value. If the glyph table contains less than n glyphs, the servlet may loop back to the first glyph in the glyph table after counting the last glyph in the glyph table until the servlet reaches the nth glyph in the glyph table in which the single point is to be inserted. In one or more additional or alternative arrangements, multiple single points may be inserted into the nth glyph in the glyph table, and/or one or more single points may be inserted into additional glyphs, other than the nth glyph, based on other similar calculations.

In step 520, a second watermark may be embedded in the font file. According to one or more aspects, the second watermark may be embedded in the font file by inserting one or more tables into one or more data structures contained in the font file. Additionally or alternatively, the second watermark may be embedded in the font file if the request for the font file is determined to be valid and if it is determined that a watermarked version of the font file is not cached.

For example, a font file may include one or more data structures, such as OPENTYPE and/or TRUETYPE data structures, and a font vendor may be able to include one or more tables in such data structures to store custom metadata, such as a customer identifier and/or security token. Thus, in one example, a second watermark may be embedded in a font file by inserting one or more tables into one or more data structures contained in the font file, where the one or more tables may store one or more customer identifiers and/or security tokens. In at least one arrangement, a customer identifier and/or security token received in and/or extracted from the request for the font file may be included in the one or more customer identifiers inserted into the one or more tables of the one or more data structures contained in the font file. Additionally or alternatively, the one or more tables in the one or more data structures storing custom metadata may enable one or more steps of the method illustrated in FIG. 6 to be performed and/or might not affect the rendering of the one or more glyphs contained in the font file.

In step 522, if it is determined that a watermarked version of the font file is cached, the watermarked version of the font file may be retrieved. For instance, in response to determining that a watermarked version of the font file is cached, the servlet may locate and retrieve the watermarked version of the font file from memory storing the previously watermarked font file.

In step 525, the font file may be served. For example, where it is determined that the request for the font file is valid and where it is determined that a watermarked version of the font file is not cached, and after the first watermark and/or the second watermark are embedded in the font file, the servlet may transmit the font file to the user, website, and/or computer that requested the font file. In another example, where it is determined that the request for the font file is valid and where it is determined that a watermarked version of the font file is cached, and after the watermarked version of the font file is received, the servlet may transmit the font file to the user, website, and/or computer that requested the font file.

Figure 6:
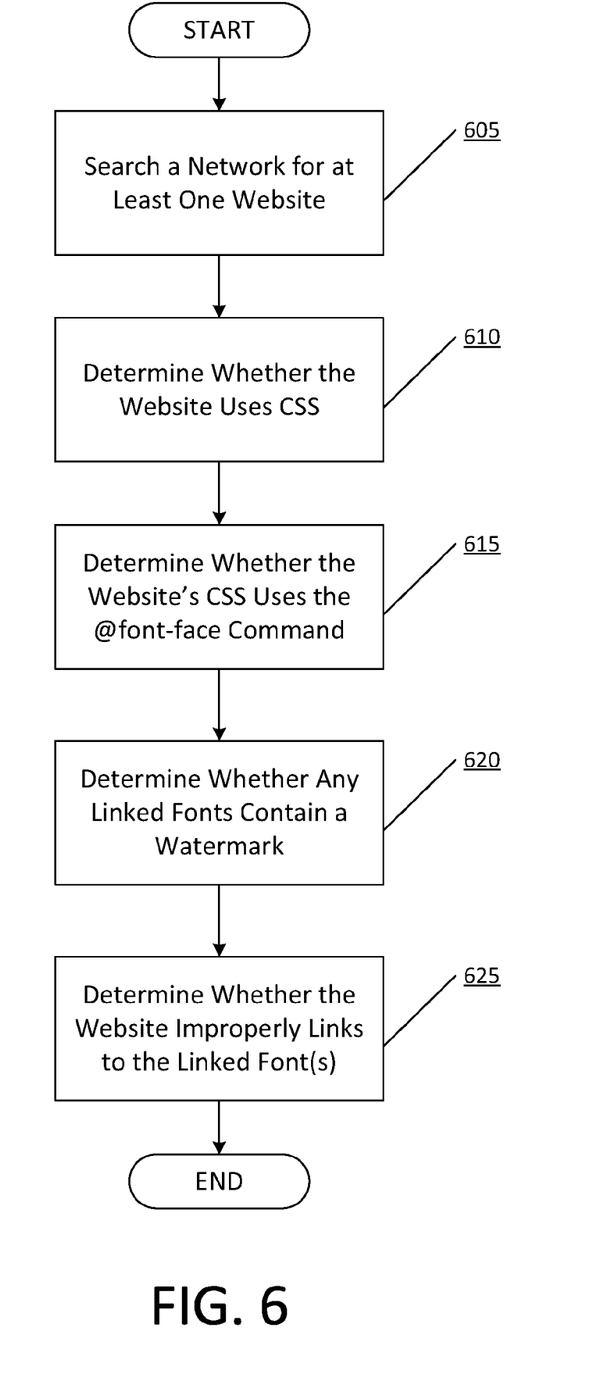
FIG. 6 illustrates a method by which the validity of a font link may be evaluated according to one or more aspects described herein.

FIG. 6 illustrates a method by which the validity of a font link may be evaluated according to one or more aspects described herein. It may be desirable to perform the method illustrated in FIG. 6, as such a method may enable a font developer, font host, and/or authorized font user to determine whether a particular website links to one or more fonts without the authorization of the font developer, font host, and/or authorized font user. One or more of the computers, servers, and/or networks illustrated in FIG. 2 may implement the method illustrated in FIG. 6, as well as any variations thereof and/or any of the other methods described herein. Thus, in one or more arrangements, the method of FIG. 6 may be implemented in network environment 200.

In step 605, a network may be searched for at least one website. For example, servlet host 225 may search the Internet 215 for one or more websites, and may select iteratively and/or randomly a website of the one or more websites on the Internet 215 for evaluation as further described herein.

In step 610, it may be determined whether the at least one website located in the searching includes CSS code. For example, servlet host 225 may determine whether the selected website includes CSS code. If it is determined that the selected website does not include CSS code, the method may end. On the other hand, if it is determined that the selected website contains CSS code, the method may continue to step 615.

In step 615, it may be determined whether the CSS code of the at least one website located in the searching includes an @font-face command. For example, servlet host 225 may determine whether the CSS code of the selected website includes the @font-face command. If it is determined that the CSS code of the selected website does not include the @font-face command, the method may end. On the other hand, if it is determined that the CSS code of the selected website contains the @font-face command, the method may continue to step 620.

In step 620, it may be determined whether each of the one or more fonts linked to by the CSS code of the at least one website located in the searching includes one or more watermarks. For example, servlet host 225 may generate and/or submit one or more requests for each of the one or more fonts linked to by the CSS code (e.g., an @font-face command) of the selected website. Upon receiving at least one font file in response to such a request, servlet host 225 may evaluate the received font file to determine whether it contains one or more watermarks. Thus, servlet host 225 may determine whether the received font file includes a first watermark, which may be in the form of one or more single points in the one or more glyphs contained in the font file. More specifically, by scanning the data that defines the one or more glyphs contained in the received font file for unconnected single points, servlet host 225 may determine whether the received font file includes a first watermark. Because a font file typically might not contain unconnected single points, servlet host 225 may consider any unconnected single points or zero-length vectors found in the received font file to be part of the first watermark. Additionally or alternatively, servlet host 225 may determine whether the received font file contains a second watermark, which may be in the form of one or more tables stored in one or more data structures of the received font file.

In step 625, it may be determined whether the at least one website located in the searching improperly links to each of the one or more fonts linked to by the CSS code. For example, servlet host 225 may calculate and/or determine, based on the first watermark contained in the received font file, a customer identifier and/or a security token for the received font file. Additionally or alternatively, servlet host 225 may calculate and/or determine, based on the second watermark contained in the received font file, a customer identifier and/or a security token for the received font file. Subsequently, servlet 225 may determine whether the calculated and/or determined customer identifier and/or security token corresponds to the selected website.

For example, servlet 225 may compare identification information (e.g., the web address) of the selected website with stored identification information corresponding to the calculated and/or determined customer identifier and/or security token, such as a list of one or more web addresses authorized to link to the one or more fonts contained in the received font file, where the list may be stored in a database accessible by servlet 225. Based on such a comparison, servlet 225 may determine that the identification information of the selected website does not match with the stored identification information corresponding to the calculated and/or determined customer identifier and/or security token, in which case servlet 225 may determine that the selected website improperly links to the received font file and/or may flag the selected website for further review. On the other hand, servlet 225 may determine that the identification information of the selected website matches the stored identification information corresponding to the calculated and/or determined customer identifier and/or security token, in which case servlet 225 may determine that the selected website properly links to the received font file.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   receiving, by a computing device, a request for a font file;
   determining whether the request is valid;
   in response to determining that the request is valid, embedding a first watermark in the font file at least by inserting one or more zero-length vectors at one or more locations in the font file; and
   serving the font file.

2. The method of claim 1, further comprising:
   embedding a second watermark in the font file at least by inserting one or more data tables into one or more data structures of the font file, wherein the one or more data tables include a customer identifier.

3. The method of claim 1, wherein determining whether the request is valid includes evaluating a security token.

4. The method of claim 3, wherein inserting the one or more zero-length vectors includes inserting the one or more zero-length vectors at the one or more locations in the font file according to a pattern based on the security token.

5. The method of claim 1, wherein determining whether the request is valid includes evaluating a referrer string.

6. The method of claim 2, further comprising:
   searching a network for at least one website; and
   determining whether the at least one website improperly links to the font file.

7. The method of claim 6, wherein determining whether the at least one website improperly links to the font file is based on the first watermark and the second watermark.

8. One or more non-transitory computer-readable media storing computer-executable instructions that, when executed by one or more computers, cause the one or more computers to:
   receive a request for a font file;
   determine whether the request is valid;
   in response to determining that the request is valid, embed a first watermark in the font file at least by inserting one or more zero-length vectors at one or more locations in the font file; and
   serve the font file.

9. The one or more non-transitory computer-readable media of claim 8 storing additional computer-executable instructions that, when executed, cause the one or more computers to:
   embed a second watermark in the font file at least by inserting one or more data tables into one or more data structures of the font file, wherein the one or more data tables include a customer identifier.

10. The one or more non-transitory computer-readable media of claim 8, wherein determining whether the request is valid includes evaluating a security token.

11. The one or more non-transitory computer-readable media of claim 10, wherein inserting the one or more zero-length vectors includes inserting the one or more zero-length vectors at the one or more locations in the font file according to a pattern based on the security token.

12. The one or more non-transitory computer-readable media of claim 8, wherein determining whether the request is valid includes evaluating a referrer string.

13. The one or more non-transitory computer-readable media of claim 9 storing additional computer-executable instructions that, when executed, cause the one or more computers to:
   search a network for at least one website; and
   determine whether the at least one website improperly links to the font file.

14. The one or more non-transitory computer-readable media of claim 13, wherein determining whether the at least one website improperly links to the font file is based on the first watermark and the second watermark.

15. An apparatus, comprising:
   one or more processors; and
   memory storing computer-readable instructions that, when executed by the one or more processors, cause the apparatus to:
   receive a request for a font file;
   determine whether the request is valid;
   in response to determining that the request is valid, embed a first watermark in the font file at least by inserting one or more zero-length vectors at one or more locations in the font file; and
   serve the font file.

16. The apparatus of claim 15, wherein the memory further stores computer-readable instructions that, when executed by the one or more processors, cause the apparatus to:
   embed a second watermark in the font file at least by inserting one or more data tables into one or more data structures of the font file, wherein the one or more data tables include a customer identifier.

17. The apparatus of claim 15, wherein determining whether the request is valid includes evaluating a security token.

18. The apparatus of claim 17, wherein inserting the one or more zero-length vectors includes inserting the one or more zero-length vectors at the one or more locations in the font file according to a pattern based on the security token.

19. The apparatus of claim 15, wherein determining whether the request is valid includes evaluating a referrer string.

20. The apparatus of claim 16, wherein the memory further stores computer-readable instructions that, when executed by the one or more processors, cause the apparatus to:
   search a network for at least one website; and
   determine, based on the first watermark and the second watermark, whether the at least one website improperly links to the font file.

21. A method of preventing unauthorized font linking, comprising:
- receiving a request for a first font file, the request being triggered by a font link included in a style sheet;
- determining, based on a referrer string associated with the request, whether the request originates from a valid source;
- in response to determining that the request originates from a valid source:
  - associating the request with a customer identifier, the customer identifier corresponding to a customer associated with the style sheet,
  - embedding a first watermark in the first font file at least by inserting one or more zero-length vectors at one or more locations in the first font file according to a pattern based on a customer identifier, and
  - embedding a second watermark in the first font file at least by inserting one or more data tables into one or more data structures of the first font file, wherein the one or more data tables include the customer identifier;
- searching a network for at least one document;
- determining whether the at least one document links to a second font file;
- evaluating the second font file to determine whether the second font file includes the first watermark or the second watermark;
- in response to determining that the second font file includes the first watermark or the second watermark, determining whether the at least one document is associated with the customer; and
- in response to determining that the at least one document is not associated with the customer, determining that the at least one document improperly links to the second font file.

* * * * *